United States Patent
Ooshiro et al.

(10) Patent No.: US 11,655,562 B2
(45) Date of Patent: May 23, 2023

(54) ELECTROSPINNING HEAD, ELECTROSPINNING APPARATUS, AND CLEANING METHOD OF ELECTROSPINNING HEAD

(71) Applicant: KABUSHIKI KAISHA TOSHIBA, Tokyo (JP)

(72) Inventors: Kenichi Ooshiro, Yokohama (JP); Kenya Uchida, Yokohama (JP); Kanta Sugimoto, Yokohama (JP); Shizuo Kinoshita, Yokohama (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 0 days.

(21) Appl. No.: 17/398,417

(22) Filed: Aug. 10, 2021

(65) Prior Publication Data

US 2022/0106710 A1    Apr. 7, 2022

(30) Foreign Application Priority Data

Oct. 1, 2020 (JP) .............................. JP2020-167023

(51) Int. Cl.
    *B08B 5/04*      (2006.01)
    *B08B 6/00*      (2006.01)
    (Continued)

(52) U.S. Cl.
    CPC ......... *D01D 5/0069* (2013.01); *B29C 48/272* (2019.02); *B29C 48/92* (2019.02);
    (Continued)

(58) Field of Classification Search
    CPC .. B08B 5/04; B08B 6/00; B08B 9/023; B29C 48/272; B29C 48/92; B29C 2948/9299;
    (Continued)

(56) References Cited

U.S. PATENT DOCUMENTS

5,942,043 A * 8/1999 Suemune ............. B41J 2/16517
    347/30
2001/0022601 A1 * 9/2001 Ishii ........................... B41J 2/06
    347/55

(Continued)

FOREIGN PATENT DOCUMENTS

JP    2-153837 A    6/1990
JP    6-246210 A    9/1994

(Continued)

*Primary Examiner* — Leo B Tentoni
(74) *Attorney, Agent, or Firm* — Oblon, McClelland, Maier & Neustadt, L.L.P.

(57) ABSTRACT

According to an embodiment, an electrospinning head includes a nozzle and an uneven surface. The nozzle is made from an electrically conductive material, and a flow path is formed inside the nozzle. On the outer surface of the nozzle, an ejection port capable of ejecting a material liquid supplied to the flow path is formed. The uneven surface is formed in the vicinity of the projection port on the outer surface of the nozzle, and an uneven shape of the uneven surface is formed around the entire circumference of the circumferential direction of the nozzle and is along the extending direction of the flow path.

6 Claims, 6 Drawing Sheets

(51) Int. Cl.
*B08B 9/023* (2006.01)
*D01D 4/02* (2006.01)
*D01D 4/04* (2006.01)
*D01D 5/00* (2006.01)
*D01D 4/06* (2006.01)
*B29C 48/92* (2019.01)
*B29C 48/27* (2019.01)
*B41J 2/165* (2006.01)

(52) U.S. Cl.
CPC ............ *B41J 2/16532* (2013.01); *D01D 4/06* (2013.01); *D01D 5/0061* (2013.01); *D01D 5/0076* (2013.01); *B29C 2948/9299* (2019.02); *B41J 2002/16561* (2013.01)

(58) Field of Classification Search
CPC ........ B41J 2/16532; B41J 2002/16561; D01D 4/02; D01D 4/04; D01D 5/0061; D01D 5/0069

USPC .... 264/39, 402, 404; 425/135, 174.8 E, 225, 425/227, 229; 134/1, 18, 21; 347/6, 22, 347/30, 47
See application file for complete search history.

(56) References Cited

U.S. PATENT DOCUMENTS

2006/0049542 A1\* 3/2006 Chu ..................... D01D 5/0069
425/382.2
2016/0083868 A1\* 3/2016 Park ..................... D01D 5/0069
425/174.8 E

FOREIGN PATENT DOCUMENTS

| JP | 2001-205160 A | 7/2001 |
| JP | 2004-323988 A | 11/2004 |
| JP | 2008-202169 A | 9/2008 |

\* cited by examiner

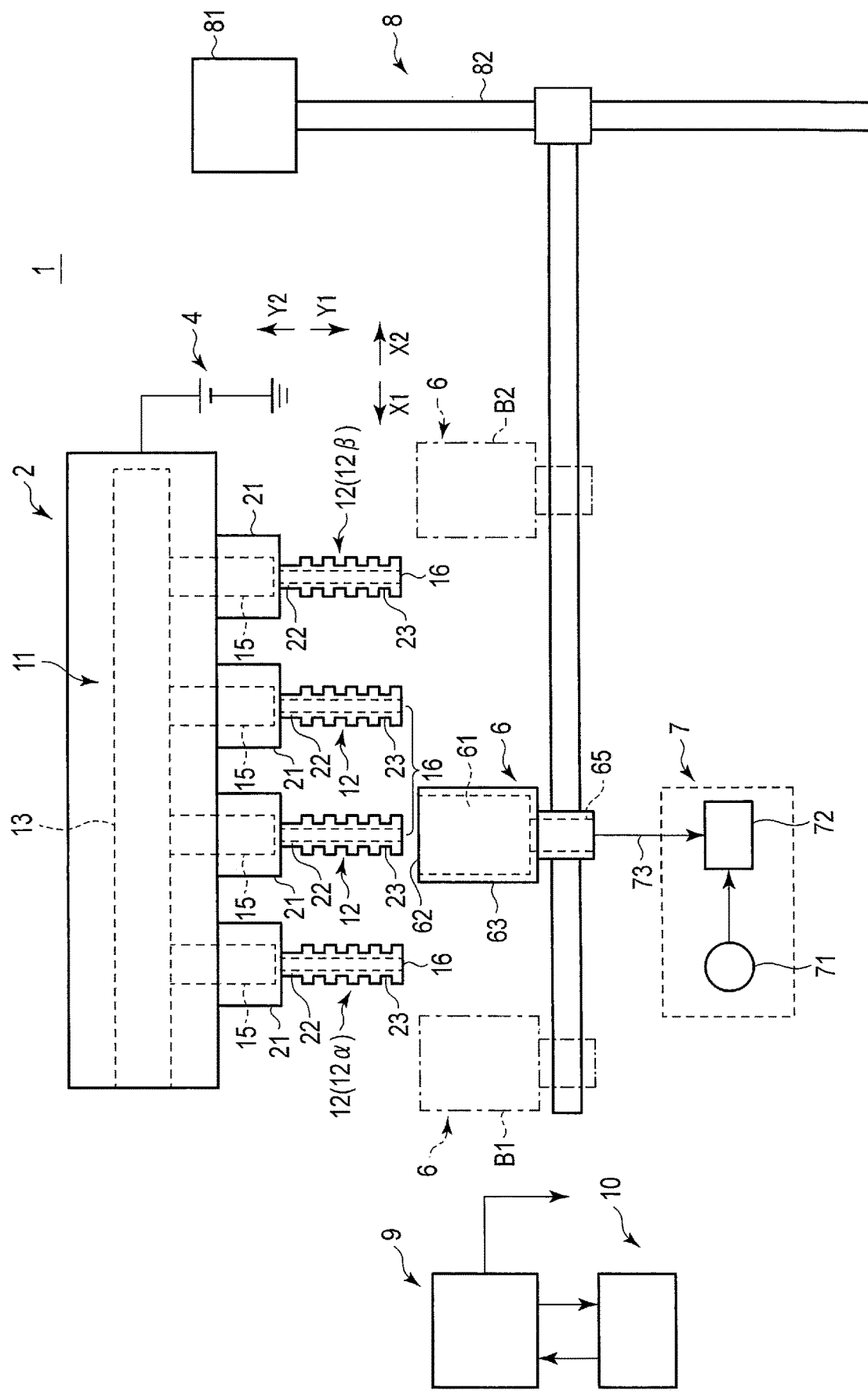
F I G. 2

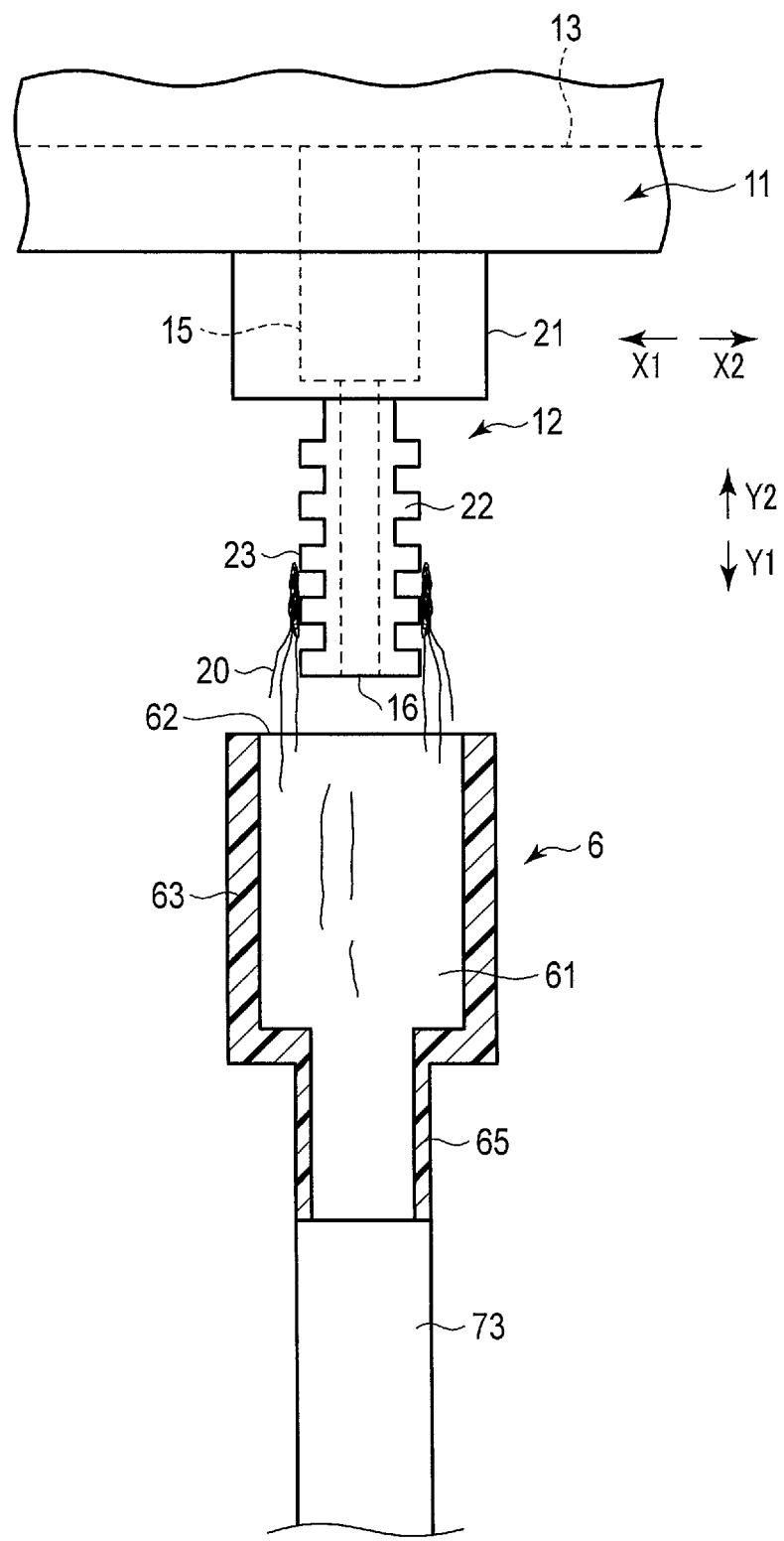
F I G. 4

ELECTROSPINNING HEAD, ELECTROSPINNING APPARATUS, AND CLEANING METHOD OF ELECTROSPINNING HEAD

CROSS-REFERENCE TO RELATED APPLICATIONS

This application is based upon and claims the benefit of priority from Japanese Patent Application No. 2020-167023, filed Oct. 1, 2020, the entire contents of which are incorporated herein by reference.

FIELD

Embodiments described herein relate to an electrospinning head, an electrospinning apparatus, and a cleaning method of an electrospinning head.

BACKGROUND

An electrospinning apparatus that accumulates microfibers on a surface of a collection body or a substrate to form a fiber film with an electrospinning method (sometimes called "electric charge induction spinning method"). In the electrospinning apparatus, an electrospinning head including a nozzle is supplied with a material liquid including a high polymer material. A voltage is applied to the nozzle and a material liquid is supplied to the electrospinning head so as to electrify the material liquid, which is then ejected against the surface of a collection body or a substrate from an ejection port of the nozzle. Fiber is thereby accumulated on the surface of the collection body or the substrate.

If the work of fiber film formation is performed by the electrospinning apparatus as described above, the fiber, droplets of the material liquid, and a high polymer material of the material liquid may be deposited in the vicinity of the ejection port on the outer surface of the nozzle. For this reason, after the work of forming a film of the fiber is performed, the deposits on the nozzles are removed so as to clean the electrospinning head. In the electrospinning apparatus, it is demanded to effectively and appropriately perform electrospinning apparatus cleaning through removal of deposits on the nozzles. In other words, it is demanded to effectively and appropriately clean the electrospinning head.

BRIEF DESCRIPTION OF THE DRAWINGS

FIG. 2 is a schematic diagram showing a state in which an electrospinning head is being cleaned in the electrospinning apparatus according to the first embodiment.

FIG. 4 is a schematic diagram showing a nozzle and a suction head when suction is being performed with the suction head and a suction unit according to the first embodiment.

DETAILED DESCRIPTION

According to an embodiment, an electrospinning head includes a nozzle and an uneven surface. The nozzle is made from an electrically conductive material, and a flow path is formed inside of the nozzle. On the outer surface of the nozzle, an ejection port capable of ejecting a material liquid supplied to the flow path is formed. The uneven surface is formed in the vicinity of the ejection port on the outer surface of the nozzle, and the uneven shape of the uneven surface is arranged around the entire circumference of the nozzle in the circumferential direction and is along the extending direction of the flow path.

Hereinafter, the embodiments will be described with reference to the accompanying drawings.

First Embodiment

Figure 1:
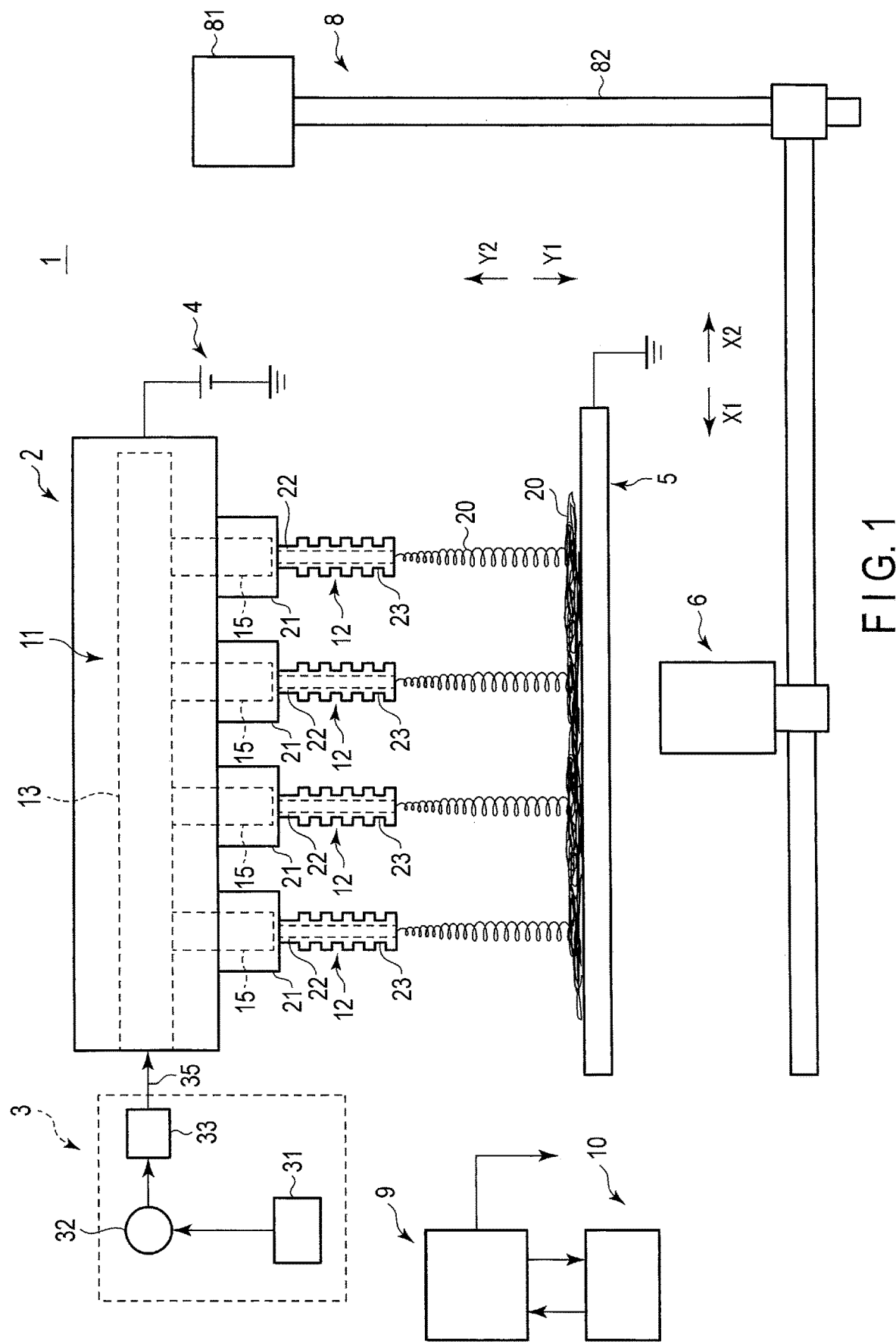
FIG. 1 is a schematic diagram showing a state in which a fiber film is being formed in an electrospinning apparatus according to a first embodiment.

FIGS. 1 and 2 show an example of an electrospinning apparatus according to the first embodiment. As shown in FIGS. 1 and 2, the electrospinning apparatus 1 includes an electrospinning head 2, a supplier 3 of a material liquid, a power supply source 4, a collection body 5, a suction head 6, a suction unit 7, a head mover unit 8, a controller 9, and a user interface 10.

The electrospinning head 2 has a head main body 11 and one or more (four in the present embodiment) nozzles 12. Herein, the center axis of the head main body 11 (electrospinning head 2) is defined, and the direction along the center axis of the head main body 11 is defined as a longitudinal direction. The head main body 11 extends along the center axis and extends along the longitudinal direction. In the present embodiment, the head main body 11 and each of the nozzles 12 are made from an electrically conductive material. The number of the nozzles 12 is not limited particularly, and at least one nozzle 12 will suffice. Preferably, the head main body 11 and each of the nozzles 12 are respectively made of materials having resistance against a material liquid and may be made of stainless steel, for example.

Each of the nozzles 12 is provided on the outer peripheral surface of the head main body 11. Each of the nozzles 12 projects from the outer peripheral surface of the head main body 11 toward the outer peripheral side, namely toward the side away from the center axis of the head main body 11. In the present embodiment, the plurality of nozzles 12 are arranged at the same, or substantially the same, angle positions in a direction around the center axis of the head main body 11. For this reason, in the present embodiment, the plurality of nozzles 12 are arranged along the longitudinal direction of the electrospinning head 2 and constitute a nozzle row. FIGS. 1 and 2 show a state viewed in a direction intersecting the center axis (longitudinal direction) of the electrospinning head 2 and intersecting the projecting direction of the nozzles 12.

In the inside of the head main body 11, an inner hollow 13 is formed. The inner hollow 13 is formed along a longitudinal direction (center axis) of the electrospinning head 2. In the inside of each nozzle 12, a flow path 15 is formed. In each nozzle 12, the flow path 15 extends along the direction in which the nozzle projects from the head main body 11. Thus, in each nozzle 12, the direction in which the flow path 15 extends corresponds to, or approximately corresponds to, the projection direction from the head main body 11. One end (inner-peripheral end) of each flow path 15 is connected to the inner hollow 13.

At the other end (outer-peripheral end) of each flow path 15, an ejection port 16 is formed. In each nozzle 12, the ejection port 16 is formed on the outer surface. In the present embodiment, the ejection port 16 is formed at the projection end (distal end) of each nozzle 12 in the head main body 11. At the ejection port 16, each flow path 15 opens to the outside of the electrospinning head 2. In each nozzle 12, the ejection port 16 communicates with the inner hollow 13 of the head main body 11 via the flow path 15. For this reason, each nozzle 12 can eject, from the ejection port 16, a material liquid supplied in the flow path 15 through the inner hollow 13. In each nozzle 12, a material liquid can be ejected from the head main body 11 toward the side toward which the nozzle projects, in other words, toward the side to which the ejection port 16 opens.

Figure 3:
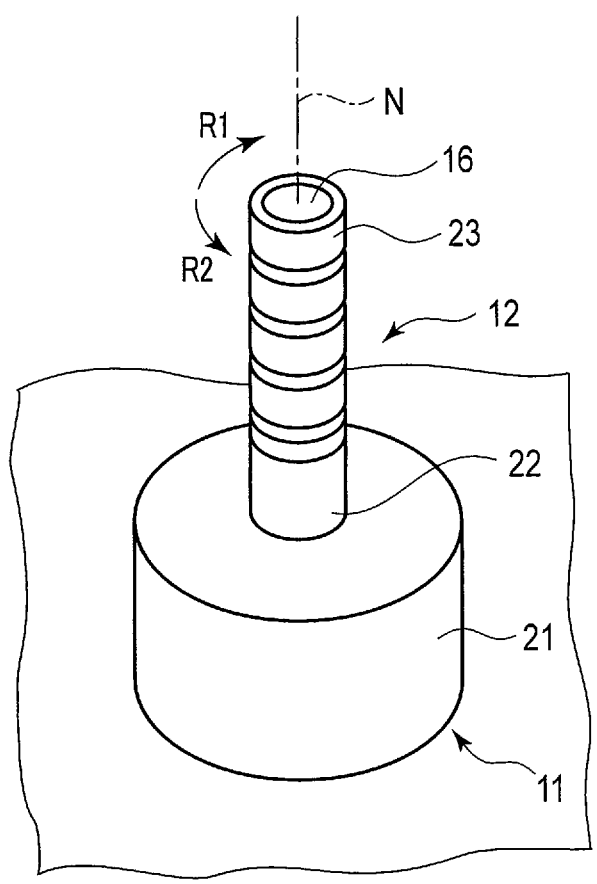
FIG. 3 is a perspective view schematically showing a structure of a nozzle in an electrospinning head according to the first embodiment.

FIG. 3 shows a structure of one of the nozzles 12. As shown in FIGS. 1 through 3, each nozzle 12 includes a nozzle base part 21 and a needle part 22. In each nozzle 12, the nozzle base part 21 is connected to the head main body 11 and thereby constitutes the root of the projection from the head main body 11. In each nozzle 12, the needle part 22 further projects from the nozzle base part 21 toward the outer peripheral side of the electrospinning head 2, and constitutes a projecting end from the head main body 11. Thus, the ejection port 16 is formed at the needle part 22 in each nozzle 12. Furthermore, in each nozzle 12, the outer diameter of the needle part 22 is smaller than that of the nozzle base part 21. In each nozzle 12, in the cross section perpendicular to, or approximately perpendicular to the extending direction of the flow path 15, the area size surrounded by the outer periphery of the needle part 22 is smaller than the area size surrounded by the outer periphery of the nozzle base part 21.

In each nozzle 12, the center axis (nozzle center axis) N is defined. In each nozzle 12, the center axis N is along the extending direction of the flow path 15 and is coaxial with, or approximately coaxial with, the center axis of the flow path 15. In each nozzle 12, the circumferential direction (the direction indicated by arrows R1 and R2), which is a peri-axial direction of the central axis N, is defined. On the outer surface of each nozzle 12, an uneven surface 23 is formed in the needle part 22. In each nozzle 12, the uneven surface 23 is formed from the projecting end toward the inner peripheral side of the electrospinning head 2, and is formed in the projecting end and the vicinity thereof. Thus, in each nozzle 12, the uneven surface 23 is formed in the vicinity of the ejection port 16. In each nozzle 12, the uneven surface 23 is formed in an uneven shape (convex-and-concave shape) along the extending direction of the flow path 15 (the projecting direction from the head main body 11). In each nozzle 12, the uneven surface 23 is formed around the entire circumference in the circumferential direction (around the center axis N). For this reason, on the uneven surface 23 of each nozzle 12, each of the depressions (concave parts) and projections (convex parts) is formed in a ring.

The supplier 3 of a material liquid is capable of supplying a material liquid to the electrospinning head 2. The supplier 3 constitutes a supply source of a material liquid and a supply path for a material liquid from the supply source to the electrospinning head 2. As shown in FIG. 1, etc., the supplier 3 of a material liquid includes a storage unit 31, a supply driver 32, a supply adjuster 33, and a supply pipe 35.

Each of the storage unit 31, the supply driver 32, the supply adjuster 33, and the supply pipe 35 has resistance to a material liquid, and in one example, each of the storage unit 31 and the supply pipe 35 is made of a material having electrically insulating properties, such as a fluorine resin.

The storage unit 31 is a reservoir for storing material liquids, for example. A material liquid is a solution of a high-polymer material in a solvent. The high polymer included in the material liquid and the solvent in which the high polymer is dissolved are determined as appropriate in accordance with the type, etc. of fiber 20 to be accumulated on the surface of the collection body 5. The high polymer material is not limited to a specific type, and any type can be used as appropriate according to material properties of the fiber 20 to be formed. The examples of the high polymer material are: polypropylene, polyethylene, polystyrene, polyethylene terephthalate, polyvinyl chloride, polycarbonate, nylon, aramid, polyimide, and polyamide-imide etc. Any solvent used for a material liquid is used provided a high polymer material can dissolve into the solvent. The solvent can be changed as appropriate in accordance with a high-polymer material to be dissolved. As the solvent, for example, water, methanol, ethanol, isopropyl alcohol, acetone, benzene, toluene, N-methyl-2-pyrrolidone (NMP), and dimethylacetamide (DMAc), etc. can be used.

The supply pipe 35 connects the storage unit 31 to the electrospinning head 2 so as to form a supply passage for the material liquid. The supply driver 32 is driven to supply a material liquid to the electrospinning head 2 from the storage unit 31 through the supply pipe 35. In one example, the supply driver 32 is a pump. The supply adjuster 33 adjusts an amount of flow and a pressure, etc. of the material liquid supplied to the electrospinning head 2. In one example, the supply adjuster 33 includes a controlling valve capable of controlling an amount of flow and a pressure, etc. of a material liquid. In this case, the supply adjuster 33 adjusts the amount of flow and the pressure, etc. of the material liquid as appropriate based on a viscosity of the material liquid and the structure of the nozzle 12, and the like. In one example, the supply adjuster 33 is capable of switching between supply and non-supply of the material liquid from the storage unit 31 to the electrospinning head 2. In this case, the supply adjuster 33 includes, for example, a switching valve.

As shown in FIGS. 1 and 2, etc., the power supply source is capable of applying voltages to the electrospinning head 2. Through an application of a voltage to the electrospinning head 2, a voltage of a predetermined polarity is applied to each nozzle 12 via the head main body 11. A voltage of the same polarity is applied to respective nozzles 12. Through an application of a voltage to the electrospinning head 2 by the power supply source 4 as described above, and a supply of a material liquid to the electrospinning head 2 by the supplier 3, the material liquid is electrified in the same polarity as the nozzles 12 (electrospinning head 2).

In one example, a terminal (not shown) electrically connected to each nozzle 12 is provided, and the power supply source 4 may apply a voltage to each nozzle 12 through the terminal. In this case, the head main body 11 is not necessarily made of an electrically conductive material. The polarity of the voltage applied to each nozzle 12 may be positive or negative. In the example shown in FIGS. 1 and 2, etc., the power supply source 4 is a direct current power source and applies a positive voltage to each nozzle 12.

The collection body 5 is made of an electrically conductive material. The collection body 5 has resistance against the material liquid, and in one example, is made of stainless steel. As shown in FIG. 1, etc., the collection body 5 is arranged, with respect to the electrospinning head 2, on the side where the nozzles 12 project and to which the projection ports 16 are open. Accordingly, with respect to the electrospinning head 2, the collection body 5 is arranged on the side where the material liquid is ejected from each nozzle 12. In the example of FIG. 1, etc., the collection body 5 is grounded and the voltage of the collection body 5 relative to the ground is 0 V or approximately 0 V. In another example, voltages of a polarity opposite to the polarity of the voltages applied to a material liquid and the electrospinning head 2 (nozzles 12) are applied to the collection body 5 by either the power supply source 4 or another power supply source.

In the present embodiment, through the application of voltages to the electrospinning head 2 and the supply of a material liquid to the electrospinning head 2, the material liquid is electrified with the same polarity as the electrospinning head 2. Furthermore, the material liquid is electrified by the same polarity as the electrospinning head 2 and thereby ejected from the ejection port 16 of each nozzle 12 toward the collection body 5 by an electric potential difference between the electrified material liquid of the electrospinning head 2 (nozzles 12) and the collection body 5. As a result of the ejection of the material liquid from the electrospinning head 2 toward the collection body 5, fiber 20 is accumulated on the surface of the collection body 5, and the accumulated fiber 20 is thereby formed into a film of the fiber 20. In other words, the film of the fiber 20 is formed by an electrospinning method (sometimes referred to as "electric charge induction spinning method"). The voltages applied to the nozzles 12 (electrospinning head 2), and the voltage applied to the collection body 5, and the like are adjusted as appropriate in accordance with a type of the high polymer material contained in the material liquid and a distance between the electrospinning head 2 and the collection body 5, etc. FIG. 1 shows a state in which a film of fiber 20 is being formed, with the suction unit 7 omitted.

The collection body 5 is formed in a plate-like shape or a sheet-like shape, for example. In the case where the collection body 5 is formed in a sheet-like shape, the fiber 20 may be accumulated on the collection body 5 rolled around the outer peripheral surface of a roll or the like. The collection body 5 may be movable. In one example, a pair of rotating drums, and their drive source, are provided. Driving of the rotating drums by the drive source causes the collection body 5 to be moved between drums in a manner similar to a conveyor belt. Through the moving (transfer) of the collection body 5, it is possible to change the area where the fiber 20 is accumulated on the surface of the collection body 5 over time. The film of the fiber 20 formed on the surface of the collection body 5 is removed from the collection body 5. The film of the fiber 20 is used as a nonwoven fabric or a filter, etc., but the usage is not limited thereto.

In one example, the collection body 5 is not provided. In this case, a substrate made of an electrically conductive material is used. Through the application of a voltage to the electrospinning head 2 in the above-described manner and the supply of a material liquid to the electrospinning head 2, the material liquid is ejected from the ejection port 16 of each nozzle 12 toward the substrate. Thus, the fiber 20 is accumulated on the surface of the substrate, and a film of the fiber 20 is formed on the surface of the substrate. In this case, the substrate may be grounded, and a voltage of an opposite polarity to the voltage applied to the electrospinning head 2 (nozzles 12) may be applied to the substrate either by the power supply source 4 or another power supply source.

In another example, a substrate is placed on the collection body 5. Through the application of a voltage to the electrospinning head 2 in the above-described manner and the supply of a material liquid to the electrospinning head 2, the material liquid is ejected from the ejection port 16 of each nozzle 12 toward the collection body 5 and the substrate. Thus, the fiber 20 is accumulated on the surface of the substrate placed on the collection body 5, and a film of the fiber 20 is formed on the surface of the substrate. In this case, even if the substrate has electrically insulating properties, it is possible to form a film of the fiber 20 on the surface of the substrate.

In the case where the substrate is arranged on the collection body 5, the substrate may be movable on the collection body 5. In one example, a rotating drum around which the substrate in a sheet-like shape is rolled, and a rotating drum that winds around itself the substrate on which the film of the fiber 20 is formed are provided. Furthermore, the substrate is moved on the collection body 5 by the rotation of each rotating drum. Through the moving (transfer) of the substrate, it is possible to change the area where the fiber 20 is accumulated on the surface of the substrate over time. As an example where the film of the fiber 20 is formed on the surface of the substrate, although not limited thereto, manufacturing of a separator-integrated type electrode for a battery is known. In this case, either one of the negative electrode or the positive electrode of an electrode group may be used as the substrate. The film of the fiber 20 formed on the surface of the substrate serves as a separator integrated with the negative electrode or the positive electrode.

In the electrospinning apparatus 1, when the work to form a film of the fiber 20 is performed as described above, the fiber 20, droplets of the material liquid and a high polymer material of the material liquid deposited on the outer surface of each nozzle 12, particularly in the vicinity of the ejection port 16. For this reason, after the work of forming a film of the fiber 20 is performed, the deposits on the nozzles 12 are removed so as to clean the electrospinning head 2. The suction head 6 and the suction unit 7 are used to clean the electrospinning head 2. FIG. 2 shows the state in which the electrospinning head 2 is being cleaned, with the supplier 3 and the collection body 5 being omitted. The suction head 6 and the suction unit 7 suction the deposits, etc. on the nozzles 12 during the cleaning of the electrospinning head 2.

FIG. 4 shows one of the nozzles 12 and the suction head 6 in a state in which suction is being performed by the suction head 6 and the suction unit 7. As shown in FIGS. 1, 2, and 4, etc., the suction head 6 is formed in the shape of a cylinder, and a suction hollow 61 is formed therein. The suction hollow 61 opens at a suction opening 62 to the outside of the suction head 6. The suction head 6 is made from a material having electrically insulating properties, for example a resin having electrically insulating properties. The suction head 6 includes head constituent parts 63 and 65. In the example shown in FIGS. 2 and 4, etc., the head constituent part (first head constituent part) 63 has an outer diameter larger than that of the head constituent part (second head constituent part) 65. In the head constituent part 63, the suction opening 62 is formed at the end on the side opposite to the head constituent part 65.

The suction unit 7 constitutes a suction source for suctioning from the suction opening 62 of the suction head and a suction passage from the suction head 6 to the suction source. As shown in FIG. 2, etc., the suction unit 7 includes a suction driver 71, a collecting unit 72, and a suction pipe 73. Being driven, the suction driver 71 causes matter to be suctioned from the suction opening 62 of the suction head 6.

Through the driving of the suction driver 71 (suction driving) as described above, a suction force is exerted in such a manner that matter on the outside of the suction head 6 are drawn into the suction hollow 61 via the suction opening 62. The suction driver 71 is a pump or a blower, etc.

The collecting unit 72 is a tank for accumulating matter suctioned through the suction opening 62. In the suction unit 7, a filter (not shown), etc. is provided between the suction driver 71 and the collecting unit 72, so that suctioned matter is prevented from flowing into the suction driver 71. The suction pipe 73 connects the suction head 6 to the collecting unit 72, thereby forming a suction passage for suctioned matter. As shown in FIG. 4, etc., in the suction head 6, the head constituent part 65 is connected to the suction pipe 73 on the side opposite to the suction opening 62.

The head mover unit 8 constitutes a mechanism for moving the suction head 6 relative to the electrospinning head 2, etc. Herein, in the electrospinning apparatus 1, a first direction (the direction indicated by arrows X1 and X2), a second direction intersecting (perpendicular or approximately perpendicular to) the first direction (the direction indicated by arrows Y1 and Y2), a third direction intersecting (perpendicular or approximately perpendicular to) the first and second directions (the direction perpendicular or approximately perpendicular in the sheets of FIGS. 1 and 2) are defined. In one example, the third direction corresponds to, or approximately corresponds to, a vertical direction. The suction head 6 is movable in the first direction by the head mover unit 8. The suction head 6 is also movable in at least one of the second direction or the third direction by the head mover unit 8.

In the example shown in FIGS. 1 and 2, etc., the longitudinal direction of the electrospinning head 2 corresponds to, or approximately corresponds to, the first direction. For this reason, the direction in which a plurality of nozzles 12 are arrayed in a nozzle row corresponds to, or approximately corresponds to, the first direction. In the example shown in FIGS. 1 and 2, etc., each nozzle 12 projects on one side (the arrow Y1 side) of the second direction, and each flow path 15 opens to one side (the arrow Y1 side) of the second direction at the ejection port 16. For this reason, in each nozzle 12, a material liquid is ejected from the ejection port 16 toward one side of the second direction.

The head mover unit 8 includes a movement driver 81 and a driving force transmitting unit 82. The movement driver 81 includes a driving member such as an electric motor, etc., and the driving member is supplied with the electric power with which it is driven. The driving force transmitting unit 82 couples the movement driver 81 to the suction head 6. The driving force transmitting unit 82 transmits a driving force generated in the driving member of the movement driver 81 to the suction head 6 and thereby causes the suction head 6 to be moved. Herein, if the suction head 6 is movable in two directions, two driving members are provided in the movement driver 81; if the suction head 6 is movable in three directions, three driving members are provided in the movement driver 81. Multiple driving members are not necessarily arranged in a single movement driver 81; in one example, multiple driving members for moving the suction head 6 may be arranged at positions separate from each other. As the head mover unit 8 is provided in the manner described above, the suction head 6 is movable to a position close to the electrospinning head 2 as shown in FIG. 2, etc. The suction head 6 approaches the electrospinning head 2 from the side to which the ejection port 16 of each nozzle 12 opens, namely one side of the second direction (the arrow Y1 side). As the head mover unit 8 is provided, the suction head 6 is movable to a position separate from the electrospinning head 2 as shown in FIG. 1, etc. In the state shown in FIG. 1, the suction head 6 is located separate from the electrospinning head 2 in the second direction, and the collecting body 5 is located between the suction head 6 and the electrospinning head 2 according to the second direction. In a state in which the suction head 6 is moved to a position separate from the electrospinning head 2, the suction head 6 may be located separate from the electrospinning head 2 in the second direction as shown in FIG. 1, etc., and the suction head 6 may be located separate from the electrospinning head 2 in the third direction. In a state in which the suction head 6 is moved to a position separate from the electrospinning head 2, the suction head 6 may be located separate from the electrospinning head 2 in both the second and third directions.

The controller 9 is a computer, for example. The controller 9 includes a processor or an integrated circuit (control circuit) including a central processing unit (CPU), an application specific integrated circuit (ASIC), or a field programmable gate array (FPGA), and a storage medium, such as a memory. The controller 9 may include only one integrated circuit, etc., or a plurality of integrated circuits, etc. The controller 9 performs processing by executing a program, etc. stored on the storage medium, etc. The controller 9 controls the driving of the supply driver 32, the operation of the supply adjuster 33, the output of the power supply source 4, and driving of the suction driver 71 etc. The controller 9 controls the driving of the movement driver 81 to thereby control the move of the suction head 6 and adjusts positions of the suction head 6.

When a film of the fiber 20 is formed by an electrospinning method, the controller 9 controls the driving of the movement driver 81 and thereby causes the suction head 6 to be moved to a position separate from the electrospinning head 2. Then, with the suction head 6 being located at a position separate from the electrospinning head 2, the controller 9 applies a voltage to the nozzles 12 from the power supply source 4. Then, the controller 9 controls the driving, etc. of the supply driver 32 to supply a material liquid to the electrospinning head 2. Thus, the electrified material liquid is ejected from the ejection port 16 of each nozzle 12, and a film of the fiber 20 is thereby formed.

When the electrospinning head 2 is cleaned, the controller 9 controls the driving of the movement driver 81 and thereby causes the suction head 6 to be moved to a position close to the electrospinning head 2. At this time, the suction head 6 is brought into the proximity of the electrospinning head 2 from the side to which the ejection port 16 of each nozzle 12 opens. Furthermore, the controller controls the driving, etc. of the supply driver 32 to maintain the state of a material liquid not being supplied to the electrospinning head 2. Then, when the suction head 6 is located at a position close to the electrospinning head and no material liquid is being supplied to the electrospinning head 2 by the supplier 3, the controller 9 causes the power supply source 4 to apply a voltage to the nozzle 12 and causes the suction driver 71 to be driven (suction driving). Thus, as shown in FIG. 4, etc., the deposits on the nozzles 12 are electrified and the electrified deposits are suctioned into the suction hollow through the suction opening 62. Then, the suctioned deposits (suctioned matters) drawn into the suction hollow 61 are collected by the collecting unit 72 through the suction pipe 73.

When the suction driver 71 is being driven and the suction through the suction opening 62 is being performed, the controller 9 controls the driving of the movement driver 81 to cause the suction head 6 to reciprocates in the direction in which the nozzles 12 are arrayed (the direction indicated by arrow X1 and arrow X2). At this time, the suction head 6 reciprocates between the positions B1 and B2 shown in FIG. 2. Hereinafter, the nozzles located at both ends of the array direction among the nozzles 12 constituting the nozzle row will be referred to as the "nozzle 12α" and "nozzle 12β". The suction head 6 moves to the position B1, located on the outer side with respect to the nozzle 12α in the array direction of the nozzles 12. The suction head 6 then moves to the position B2, located on the outer side with respect to the nozzle 12β in the array direction of the nozzles 12. In the present embodiment, when a fiber 20 film is being formed or the electrospinning head 2 is being cleaned, a voltage is applied to the electrospinning head 2 by the same power supply source 4. In one example, however, different power supply sources may be used for applying a voltage to the electrospinning head 2 when a fiber 20 film is formed and for applying a voltage to the electrospinning head 2 when the electrospinning head 2 is cleaned.

The user interface 10 includes an operation component. With the operation component, operation commands to commence the formation of a fiber 20 film, operation commands to terminate the forming of a fiber 20 film, operation commands to commence the cleaning of the electrospinning head 2, and operation commands to terminate the cleaning of the electrospinning head 2 are input by an operator. As the operation component, for example, buttons, a dial, a display, or a touch panel may be adopted. The controller 9 conducts control based on an operation command that is input through the operation component. The user interface 10 may have a notification unit that notifies information to an operator or the like. In this case, the controller 9 causes the notification unit to notify necessary information to an operator or the like. The notification unit makes a notification through display on a screen, generation of sound, or illumination of a light.

Figure 5:
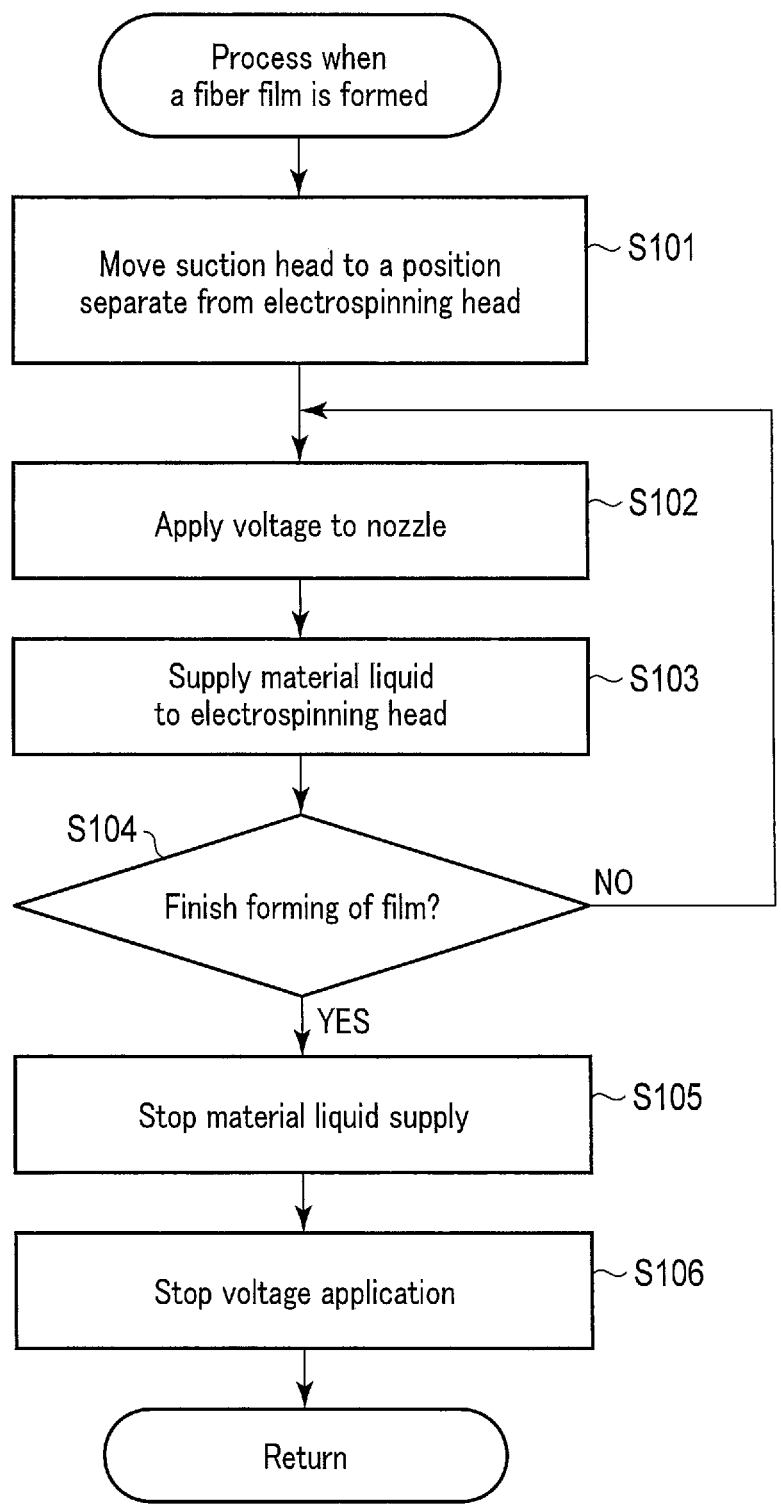
FIG. 5 is a flowchart showing an example of a process performed by a controller of the electrospinning apparatus according to the first embodiment when a fiber film is formed.

FIG. 5 shows an example of the processing performed by the controller 9 when a film 20 film is formed. When an operation command to commence the formation of a fiber 20 film is input through the operation component, etc. of the user interface 10, the controller 9 controls the driving of the movement driver 81 to move the suction head 6 to a position separate from the electrospinning head 2 (S101). Then, the controller 9 causes the power supply source 4 to apply a voltage to the electrospinning head 2 (S102). Then, the controller 9 drives, etc., the supply driver 32 and thereby causes the supply driver 32 to supply a material liquid to the electrospinning head 2 (S103). Thus, the electrified material liquid is ejected from the ejection port 16 of each nozzle 12, and a film of the fiber 20 is thereby formed.

Then, the controller 9 determines whether or not an operation command to terminate the forming of a fiber 20 film is input through the operation member, etc. of the user interface 10 (S104). If an operation command to terminate the forming of a fiber 20 film is not input (No in S104), the process returns to S102. Then, the controller 9 performs the process in S102 and thereafter in order. If an operation command to terminate the forming of a fiber 20 film is input on the other hand (Yes in S104), the controller 9 stops the driving of the supply driver 32 and thereby causes the supply of a material liquid to the electrospinning head 2 to be stopped (S105). Then, the controller 9 causes the application of a voltage to the electrospinning head 2 by the power supply source 4 to be stopped (S106). As a result, a state in which no material liquid is ejected from the ejection port 16 of each nozzle 12 is brought.

Figure 6:
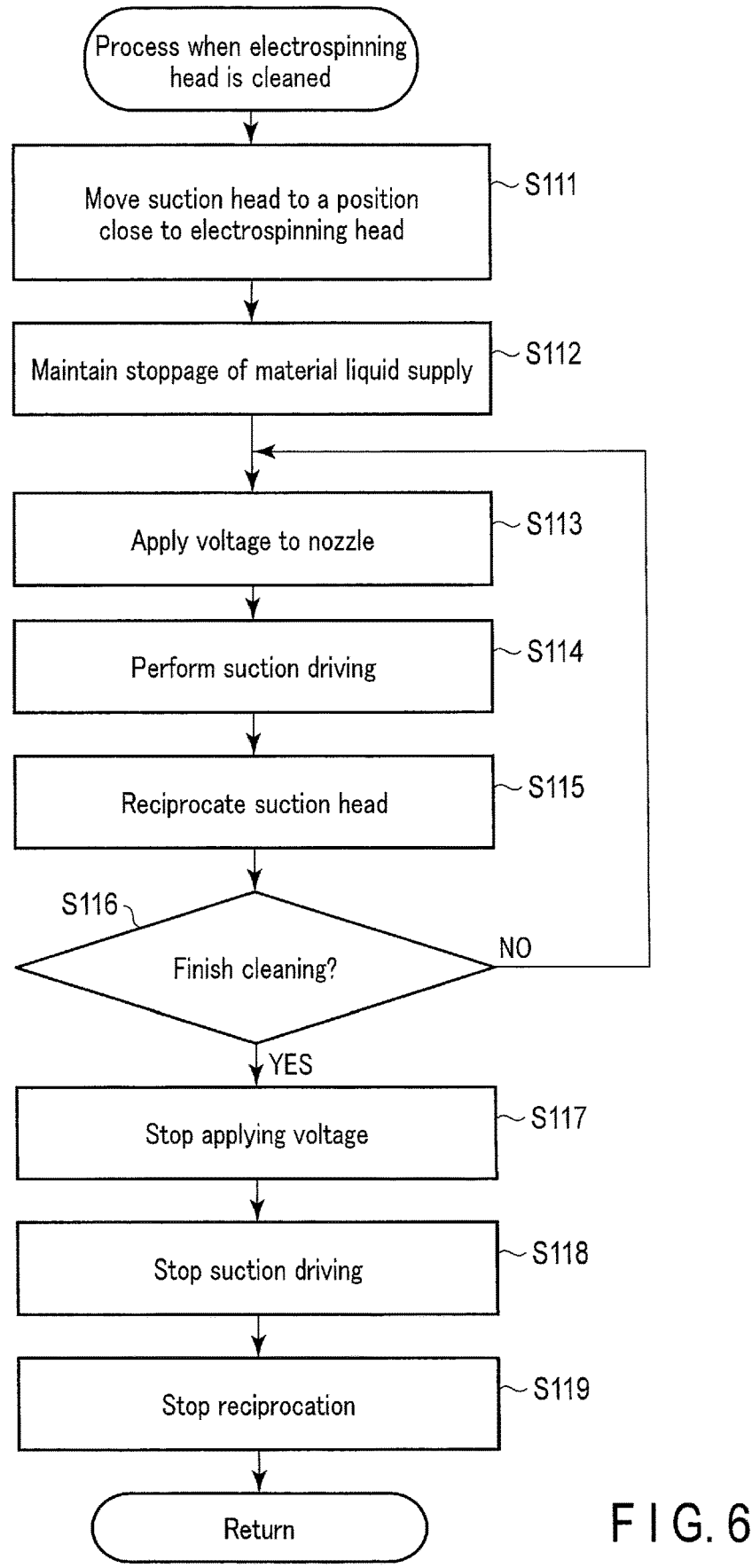
FIG. 6 is a flowchart showing an example of a process performed by a controller of the electrospinning apparatus according to the first embodiment when the electrospinning head is cleaned.

FIG. 6 shows an example of the process performed by the controller 9 when the electrospinning head 2 is being cleaned. Upon input of an operation command to commence the cleaning of the electrospinning head 2 through the operation component, etc. of the user interface 10, the controller 9 controls the driving of the movement driver 81 and thereby causes the suction head 6 to move to a position close to the electrospinning head 2 (S111). The controller 9 then, for example, maintains the state in which the driving of the supply driver 32 is stopped so as to maintain the state in which the supply of a material liquid to the electrospinning head 2 is stopped (S112). Then, in a state in which the electrospinning head 2 is not supplied with a material liquid, the controller 9 causes the power supply source 4 to apply a voltage to the electrospinning head 2 (S113) and causes the suction driver 71 to be driven (S114). Thus, the deposits on the nozzles 12 are electrified and then suctioned into the suction hollow 61 through the suction opening 62. In a state in which the suction driver 71 is being driven (in the suction driving), the controller 9 causes the suction head 6 to reciprocate along the array direction of the nozzles 12, by controlling the driving of the movement driver (S115).

Then, the controller 9 determines whether or not an operation command to terminate the cleaning of the electrospinning head 2 is input through the operation member, etc. of the user interface 10 (S116). If an operation command to terminate the cleaning is not input (No in S116), the process returns to S113. Then, the controller 9 performs the process in S113 and thereafter in order. If an operation command to terminate the cleaning is input on the other hand (Yes in S116), the controller 9 causes the power supply source 4 to stop applying a voltage to the electrospinning head 2 (S117) and causes the suction driver unit 71 to stop driving (suction driving) (S118). As a result, a state in which the suction through the suction opening 62 of the suction head 6 is not performed is brought about. Then, the controller 9 controls the driving of the movement driver 81 so as to cause the reciprocating movement of the suction head 6 to be stopped (S119).

In the present embodiment, on the outer surface of each nozzle 12, an uneven surface 23 is formed in the vicinity of the projection port 16. In each nozzle 12, the uneven surface 23 is formed in an uneven shape around the entire periphery of the circumferential direction, and the uneven shape is along the extending direction of the flow path 15. Since the uneven surface 23 is formed in each nozzle 12 as described above, on the outer surface of each nozzle 12, even when the fiber 20, droplets of a material liquid and a high polymer material of the material liquid are deposited in the vicinity of the ejection port 16, the area of contact between such deposits and the nozzle 12 can be minimized. A small area of contact between deposits and the nozzle 12 makes it easy to remove the deposits from the nozzle 12 appropriately. It is thereby possible to clean the electrospinning head 2 effectively and appropriately.

In the present embodiment, in the cleaning of the electrospinning head 2, the controller 9 causes the power supply source 4 to cause a voltage to the nozzles 12 while the electrospinning head 2 is not being supplied with a material liquid. The deposits on the nozzles 12 are thereby electrified. Thus, the deposits on the nozzles 12 can be removed more appropriately.

As described above, in the present embodiment, the deposits on the nozzles 12 are removed appropriately. For this reason, a time required until the ejection of the material liquid from each nozzle 12 becomes stable can be shortened when a film 20 fiber is formed after the electrospinning head 2 is cleaned. Thus, the efficiency in the process of forming a fiber 20 film is improved.

In the present embodiment, in a state in which a voltage is being applied to the nozzles 12 by the power supply source 4, the suction driver 71 is driven, and the deposits on the nozzles 12 are suctioned through the suction opening 62 and thereby removed. For this reason, the deposits on the nozzles 12 are removed, without causing the suction head 6 to be in contact with the nozzles 12. Since the deposits are removed without the suction head 6, etc., touching the nozzles 12, breakage of the nozzles 12 can be effectively prevented. In the present embodiment, a solvent, etc. into which the fiber 20 and a high polymer material of the material liquid are dissolved is not used to remove deposits on the nozzles 12. For this reason, after the cleaning of the electrospinning head 2, a solvent, etc. does not remain in the flow path 15 of each nozzle 12. Thus, when a fiber 20 film is formed after the electrospinning head 2 is cleaned, a time required until the ejection of a material liquid from each nozzle 12 is shortened more appropriately.

In the present embodiment, the suction head 6 is made from a material having electrical insulating properties. For this reason, even when a voltage is applied to the nozzle 12 during the cleaning of the electrospinning head 2, electrical connection of the portion made of an electrically conductive material in the suction unit 7 and the head mover unit 8, etc., with the nozzles 12 via the suction head 6 can be effectively prevented.

Furthermore, in the present embodiment, the controller 9 causes the suction head 6 to reciprocate along the array direction of the nozzles 12 as described above, when the suction driver 71 is being driven. For this reason, deposits can be appropriately suctioned and removed in any of the arrayed nozzles 12.

(Modifications)

In a modification, deposits on the nozzles 12 are removed by a rotational brush instead of the suction head 6. In this modification, an uneven surface 23 is formed on each of the nozzles 12. In the cleaning of the electrospinning head 2, the controller 9 causes the power supply source 4 to apply a voltage to the nozzles 12 while the electrospinning head 2 is not supplied with a material liquid from the supplier 3. While a voltage is being applied to the nozzles 12, the rotational brush is rotated. While a voltage is being applied to the nozzles 12, the rotating rotational brush is brought into a contact with each nozzle 12 to remove the deposits thereon.

The number of the nozzles 12 and the shape of each nozzle 12 is not limited to those in the forgoing embodiment, etc. In one modification, in the electrospinning head 2, two nozzle rows are formed on the outer peripheral surface of the head main body 11, and these nozzle rows are arranged to be shifted from each other around the center axis of the head main body 11 (in the circumferential direction of the electrospinning head 2). In each nozzle row, a plurality of nozzles 12 are arrayed in the longitudinal direction of the electrospinning head 2. In another modification, only one nozzle 12 is provided in the electrospinning head 2.

In any of the modifications, however, one or more nozzles 12 are provided in the electrospinning head 2. In each nozzle 12, a flow path 15 is formed therein, and on the outer surface, an ejection port 16 capable of ejecting a material liquid supplied to the flow path 15 is formed. On the outer surface of each nozzle 12, an uneven surface 23 is formed in the vicinity of the ejection port 16. In each nozzle 12, the uneven surface 23 is formed in an uneven shape around the entire periphery of the circumferential direction, and the uneven shape is along the extending direction of the flow path 15.

According to at least one of the foregoing embodiment and modifications, an uneven surface is formed in the vicinity of an ejection port on the outer surface of each nozzle, the uneven surface is formed in an uneven shape around the entire periphery of the circumferential direction of the nozzle, and the uneven shape is along the extending direction of the flow path. It is thereby possible to provide an electrospinning head that can be cleaned effectively and appropriately.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electrospinning head comprising:
    a nozzle made from an electrically conductive material, a flow path being formed inside of the nozzle and an ejection port being formed on an outer surface of the nozzle, the ejection port being capable of ejecting a material liquid supplied to the flow path; and
    an uneven surface formed in a vicinity of the ejection port on the outer surface of the nozzle, the uneven surface being formed in an uneven shape around an entire circumference in a circumferential direction of the nozzle, the uneven surface being along an extending direction of the flow path, each of projections being formed in a ring shape and the projections and depressions being alternatively arranged in the uneven surface.

2. An electrospinning apparatus comprising:
    the electrospinning head according to claim 1;
    a supplier that supplies the material liquid to the electrospinning head;
    an electric power source capable of applying a voltage to the nozzle of the electrospinning head; and
    a controller that causes, in a state in which the material liquid is not being supplied to the electrospinning head from the supplier, the power supply source to apply the voltage to the nozzle.

3. The electrospinning apparatus according to claim 2, wherein
    the controller causes the power supply source to apply the voltage to the nozzle and causes the supplier to supply the material liquid to the electrospinning head so as to electrify the material liquid and eject the electrified material liquid from the ejection port of the nozzle.

4. The electrospinning apparatus according to claim 2, further comprising:
    a suction head having a suction opening and made from a material having electrically insulating properties; and
    a suction driver, upon being driven, causes suctioning from the suction opening of the suction head,
    wherein the controller
        causes, in a state in which the material liquid is not being supplied to the electrospinning head by the supplier, the suction head to be close to the electrospinning head from a side to which the ejection port opens, and causes the power supply source to apply the voltage to the nozzle and causes the suction driver to be driven when the suction head is in the proximity of the electrospinning head.

5. The electrospinning apparatus according to claim 4, wherein the nozzle is provided in plurality, and the plurality of nozzles are arrayed in an array direction, each of the nozzles has the flow path and the ejection port, and includes the uneven surface, the controller causes the suction head to reciprocate along the array direction of the nozzles when the suction head is in the proximity of the electrospinning head and the suction driver is being driven.

6. A cleaning method of the electrospinning head according to claim 1, comprising:

applying a voltage to the nozzle when the electrospinning head is not supplied with the material liquid; and removing deposits on the nozzle when the electrospinning head is not supplied with the material liquid and the voltage is being applied to the nozzle.

\* \* \* \* \*